No. 714,802. Patented Dec. 2, 1902.
J. J. KISER.
MACHINE FOR APPLYING DUST INSECTICIDES AND FUNGICIDES TO TREES, &c.
(Application filed Mar. 11, 1901.)
(No Model.)
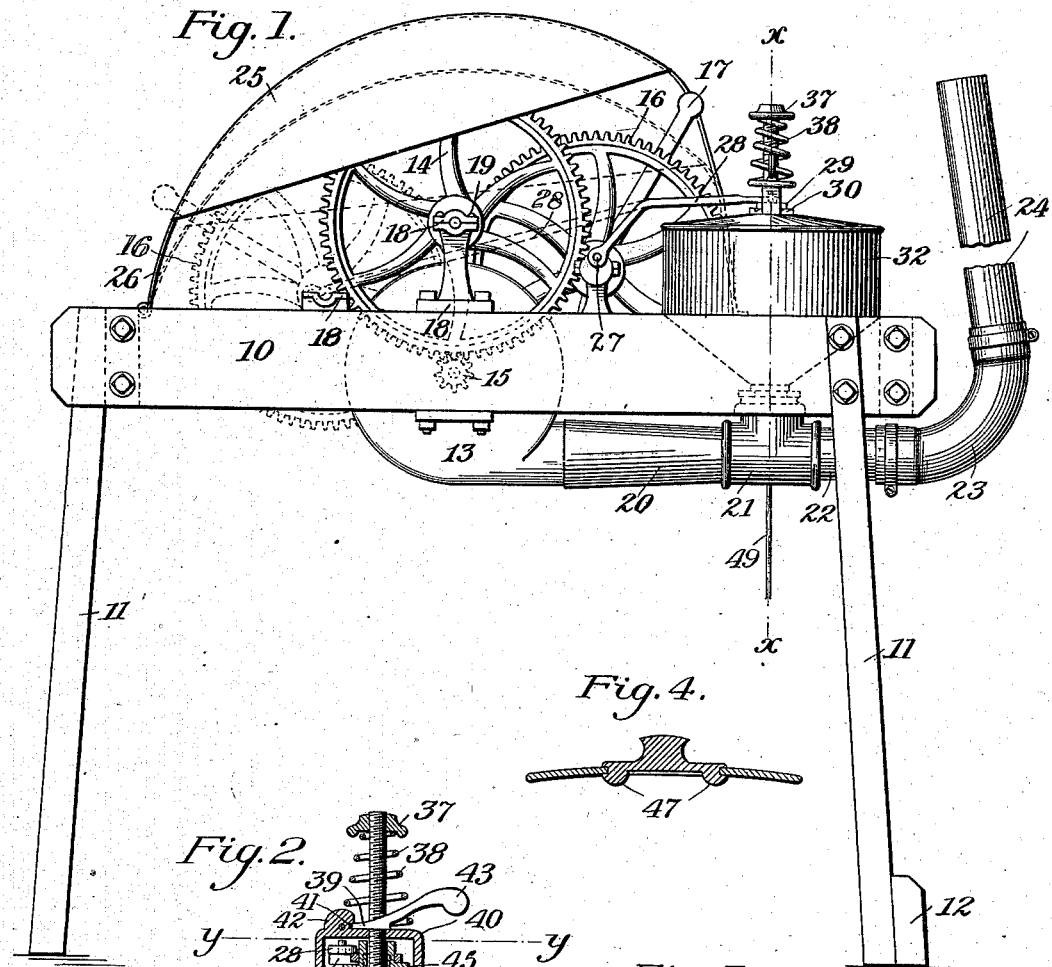
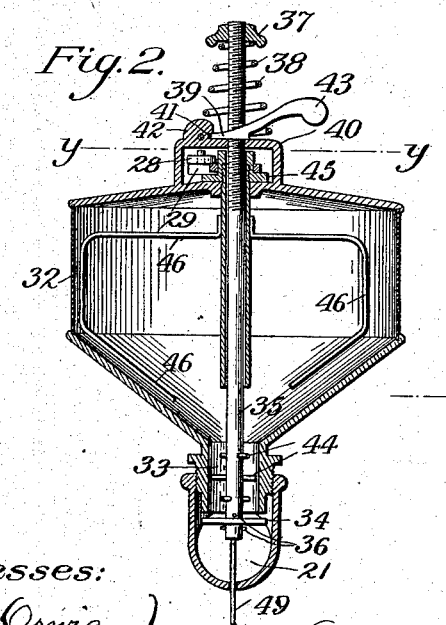
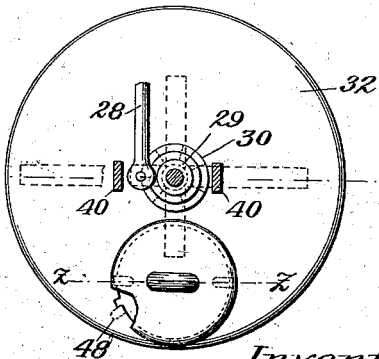
Witnesses:
L. H. Orwig.
Henry Manger.
Inventor:
Jacob J. Kiser,
By Thomas G. Orwig, Atty.
THE NORRIS PETERS CO., PHOTO-LITHO., WASHINGTON, D. C.

UNITED STATES PATENT OFFICE.

JACOB J. KISER, OF STANBERRY, MISSOURI.

MACHINE FOR APPLYING DUST INSECTICIDES AND FUNGICIDES TO TREES, &c.

SPECIFICATION forming part of Letters Patent No. 714,802, dated December 2, 1902.

Application filed March 11, 1901. Serial No. 50,607. (No model.)

*To all whom it may concern:*

Be it known that I, JACOB J. KISER, a citizen of the United States, residing at Stanberry, in the county of Gentry and State of Missouri, have invented a new and useful Machine for Applying Dust Insecticides and Fungicides to Trees, &c., of which the following is a specification.

My invention relates to improvements in dusters, whereby the dust is applied in an easy but effective method to trees, shrubs, vines, plants, and field-crops. I attain these objects by the mechanism illustrated in the accompanying drawings, in which—

Figure 1 is a horizontal side view of the machine. Fig. 2 is a vertical section at line *x x* of Fig. 1. Fig. 3 is a horizontal section at line *y y* in Fig. 2. Fig. 4 is a vertical section at line *z z* in Fig. 3.

Similar numbers refer to similar parts throughout the several views.

The machine is designed to be conveyed in or on any suitable conveyance or vehicle and is solidly built on and within a solid frame 10, supported by three legs 11, (only two are shown in drawings,) two of these legs being braced by a cross-bar 12. A rotary fan 13 is securely bolted to under side of frame 10, the shaft of which is driven by a spur-wheel 14 and rotating pinion 15. Said spur-wheel 14 is driven by a spur-wheel 16 and a pinion (not shown) on shaft of the spur-wheel 14 by means of crank 17, or a suitable sprocket-wheel may be employed and the machine driven from the wheel of a vehicle. Said spur-wheel 16 is mounted as shown in full lines when the machine is to be operated by one person and places crank 17 in a convenient position to allow the operator to manipulate the other parts of the machine. This, however, would not give sufficient room for an assistant, and therefore other mountings for shaft in spur-wheel 16 are placed to mount it as shown in open lines in boxes 18. All the boxes carrying shafts in fan 13 and wheels 14 15 16 are babbitted to enable the builder to get shafts in perfect alinement, and thus obtain the easy application of machine. These boxes are made in sections to allow the take up of wear by means of suitable screws, (shown at 19.) When the fan is revolved by means of this mechanism, it generates a current of air which passes through a connecting-tube 20 and a three-way chamber 21, nipple 22, a wire-lined rubber suction-hose 23, and metal tube 24. The rubber hose acts as a universal joint to allow the tube 24 capable of being extended to any length desired and to be turned in any direction desired.

A sheet-metal cover 25, securely riveted to a steel frame 26, (raised up to show gearing of machine and in position to oil it and shown in proper position by dotted lines in Fig. 1,) is attached by hinges at P to the frame 10. The object of this cover is to protect the hands of the operator from dangerous contact with gears and also to protect gears from any contact with limbs of trees or other obstructions in passing among trees.

On the end of the shaft opposite crank 17 is placed a short crank-pin 27, which oscillates a suitable connecting-rod 28 and which operates a pawl 29 on a ratchet 30 and turns tubular shaft 31. (Shown in Fig. 2.)

A suitable dust box or receptacle 32 is securely fixed within the frame 10 and provided with an upward extension or arched bridge at its center, Fig. 2 being a vertical section of said receptacle. In Fig. 2, 21 represents a three-way chamber into which dust falls when the valve is opened from the receptacle above through a tube 33, which is instantly opened or closed by the valve 34, loosely fastened to valve-rod 35 by two crossed pins 36, one above the other below, the valve to allow it to exactly adjust itself to end of tube 30, which acts as a valve-seat. The dust is caught by the current and forcibly blown through tubes 20, 22, and 24. The valve is opened by pressure on knob 37 and is automatically closed by flexible spring 38 when pressure ceases on the knob. The amount of dust to be discharged is regulated by a nut 39, threaded on valve-rod 35 above bridge 40, so that when valve-rod is screwed down by turning knob 37 it allows the valve to be further depressed and opened, and when the valve-rod is screwed up the nut 39 acts as a stop, in connection with the bridge 40, to prevent the valve from opening further, thus securing easy, convenient, and perfect regulation. The nut 39 is so constructed that one end forms a catch 41 to engage in the notch in the upward extension 42 on the bridge 40 by means of a convenient handle 43 on the other end of the nut. By pressing the valve-rod down and turning nut it holds the valve 34 open until the nut is turned out of catch, when spring 38 will instantly close the valve, saving much waste of material. Above the notch the bridge is extended to form a stop to prevent the nut 39 from turning around when the knob 37 is turned and acts also as a guide to prevent the nut from striking on top of the extension on the bridge 40.

Within tube 33 the valve-rod 35 is provided with several cross-pins 44, which act as guides to keep the rod in the center and the valve in right position and also act as agitators or cleaners to keep the valve from choking and to dispense with any necessity for a bridge, which would always tend to prevent the free passage of dust and choke up the passage. It is obvious dust is liable to become packed in the tube 33, and that by means of the pins 44 on the reciprocating rod 35 the packed dust can be readily loosened as required to fall into the valve-chamber 21 when the valve-stem and valve are lowered to open the lower end of said tube.

Loosely mounted on the valve-rod 35 is a tubular shaft 31, screwed into and supported by ratchet 45 on top of conical cover of dust-box 32 and held in vertical position by valve-rod 35. Said tubular shaft revolving on valve-rod 35 by means of ratchet 45 is provided with several lateral and properly-curved blades 46, which in turning agitate the mixture and keep it in suitable condition to drop through the tube 33. The ratchet 45 is turned by pawl 29, which in turn is moved by the rod 28 and crank 17. Figs. 3 and 4 show a device for fastening lid to cover of dust-receptacle. The lid is provided on the under side with extension-guides 47, which drop down through an opening in the cover 25 and turning to the right tighten on an inclined plane for keeping the lid securely in place. To open, the lid is turned to left until guides strike stop 48, when it will be released and can be readily lifted off to fill the receptacle with dust. The cover of the dust-receptacle 32 is made conical to prevent any rain from running into the dust at the bearings in the center. (See Fig. 2.)

A hole is drilled in lower end of valve-rod 35 and threaded, and a rod 49 is screwed into said thread and extends through the three-way chamber 21, as shown in Fig. 2, to which may be attached a wire or any convenient device to operate the valve-rod 35 by the foot of the operator instead of by the hand and knob 37 when both hands of the operator are otherwise employed.

Having thus described the purpose of my invention and the function and construction of each element and subcombination and the arrangement and combination of all the parts, the practical operation and utility of the invention will be readily understood by persons familiar with the art to which it pertains.

What I claim, and desire to secure by Letters Patent, is—

1. In a machine for spraying dust, a dust-receptacle terminating in a tube, a spring-actuated valve-stem extended through the dust-receptacle, a flat valve or disk fixed to the lower end of the valve-stem, means for adjusting the valve-stem for regulating the escape of dust from the receptacle, fixed pins on the lower end of the valve-stem to extend radially inside of the tube, means for adjusting the valve-stem and valve relative to the bottom of the tube, and means for reciprocating the valve-stem arranged and combined to operate in the manner set forth.

2. In a machine for spreading dust over fruit-trees, plants, &c., a rotary fan on a portable frame, a rigid tube extending from the fan, a valve-chamber connected with said tube, a dust-receptacle terminating in a tube extending into the valve-chamber, a valve in the valve-chamber on the bottom end of a valve-stem vertically adjustable in the dust-chamber, a rotatable stirrer for feeding dust from said receptacle into the valve-chamber to be subjected to the action of the fan, arranged and combined to operate in the manner set forth for the purposes stated.

3. In a machine for spreading dust over fruit-trees, plants, &c., a rotary fan on a portable frame, a rigid tube extending from the fan, a valve-chamber connected with said tube, a dust-receptacle terminating in a tube extending into the valve-chamber, a vertically-adjustable valve on the lower end of a valve-stem, means for reciprocating the valve-stem, a rotatable stirring device for feeding dust from said receptacle into the valve-chamber to be subjected to the action of the fan, a rigid tube-section connected with said valve-chamber and a flexible extension terminating in a rigid end or nozzle, arranged and combined to operate in the manner set forth for the purposes stated.

4. In a machine for throwing dust on fruit-trees, &c., a rotary fan mounted on a portable frame, a tube extending horizontally from the fan, a valve-chamber connected with said tube, a dust-receptacle connected with and terminating in a tube extending into the valve-chamber, a vertically-adjustable valve-stem, a valve at the lower end of the valve-stem and said tube, a rotary feed device or stirrer in said dust-receptacle and means for simultaneously operating the fan and the rotary stirrer, arranged and combined to operate in the manner set forth for the purposes stated.

5. In a machine for placing dust on fruit-trees, &c., a rotary fan mounted on a portable frame and provided with a fixed tube to extend horizontally, a valve-chamber fixed to said tube, a dust-receptacle fixed on top of said valve-chamber, a reciprocating valve-stem mounted in the dust-receptacle, a valve fixed to the bottom of the valve-stem and means for adjusting the valve, valve-stem and valve and means for fastening and retaining the valve-stem and valve stationary, arranged and combined to operate in the manner set forth for the purposes stated.

6. In a machine for spraying dust on fruit-trees, a dust-receptacle having a tube at the bottom, a valve-stem extended down through the receptacle and tube, a disk valve fixed to the bottom of the valve-stem, pins fixed to the valve-stem to project radially in the tube and means for imparting vertical motion to the valve-stem, arranged and combined to operate in the manner set forth for the purposes stated.

7. In a machine for spraying dust on fruit-trees, a dust-receptacle having an upward extension or arched bridge, a valve-stem extended down through the receptacle and the upward extension or bridge on its closed top, a tube rotatably mounted on the valve-stem, a ratchet-wheel fixed to the top of the tube, stirrers fixed to the tube to extend radially within the dust-receptacle and means for rotating the ratchet-wheel, arranged and combined to operate in the manner set forth for the purposes stated.

8. In a machine for spraying dust on fruit-trees, a dust-receptacle having a fixed top, an upward extension or bridge at the center of its top, a catch on top of the extension to engage a projection on a nut, a screw-threaded valve-stem extended through the center of the fixed top and bridge, a nut on the valve-stem, a handle extended from the nut, a knob fixed to the top of the valve-stem, a coil-spring on the valve-stem between the knob and the nut, a tube at the bottom of the dust-receptacle and a valve fixed to the bottom of the valve-stem, arranged and combined to operate in the manner set forth for the purposes stated.

JACOB J. KISER.

Witnesses:
R. H. ORWIG,
THOMAS G. ORWIG.